(12) United States Patent
Hendrix et al.

(10) Patent No.: US 7,258,846 B2
(45) Date of Patent: Aug. 21, 2007

(54) PROCESS AND INSTALLATION FOR THE DRY FRACTIONATION

(75) Inventors: Marc Hendrix, Balen (BE); Marc Kellens, Muizen (BE)

(73) Assignee: De Smet Engineering N.V., Zaventem (BE)

( * ) Notice: Subject to any disclaimer, the term of this patent is extended or adjusted under 35 U.S.C. 154(b) by 689 days.

(21) Appl. No.: 10/207,122

(22) Filed: Jul. 30, 2002

(65) Prior Publication Data

US 2003/0047290 A1     Mar. 13, 2003

(30) Foreign Application Priority Data

Jul. 31, 2001  (EP)  ................................. 01202906

(51) Int. Cl.
*B01D 9/00* (2006.01)
(52) U.S. Cl. .................. 422/245.1; 422/243; 117/200; 117/206
(58) Field of Classification Search ................ 422/243, 422/245.1; 117/200, 206
See application file for complete search history.

(56) References Cited

U.S. PATENT DOCUMENTS 3,973,046 A * 8/1976 Mol ............................ 426/289
4,795,569 A * 1/1989 Higuchi et al. ............. 210/770
4,960,544 A * 10/1990 Van Putte et al. .......... 554/208
5,045,243 A * 9/1991 Kuwabara et al. .......... 554/211
6,060,028 A    5/2000 Yoneda et al.
6,072,066 A * 6/2000 Tirtiaux et al. ............. 554/211
6,140,520 A * 10/2000 Hartel et al. ................ 554/211

FOREIGN PATENT DOCUMENTS

EP           1028159 A1 *   8/2000

* cited by examiner

*Primary Examiner*—Yogendra N. Gupta
*Assistant Examiner*—Matthew J. Song
(74) *Attorney, Agent, or Firm*—James Creighton Wray

(57) ABSTRACT

The invention relates to a method and installation for the dry fractionation of edible oils and fats and related products, said method comprising the steps of:
a) solidifying the product in a crystallizer comprising at least one cooling chamber that is provided with at least one wall permitting heat transfer, to form a solid block of crystallized material;
b) discharging the chambers and collecting the block;
c) crushing the block so that a pumpable paste is obtained;
d) pumping this paste into a filter press;
e) separating this paste into an olein fraction and a stearin fraction by filtration and collecting both fractions.

5 Claims, 1 Drawing Sheet

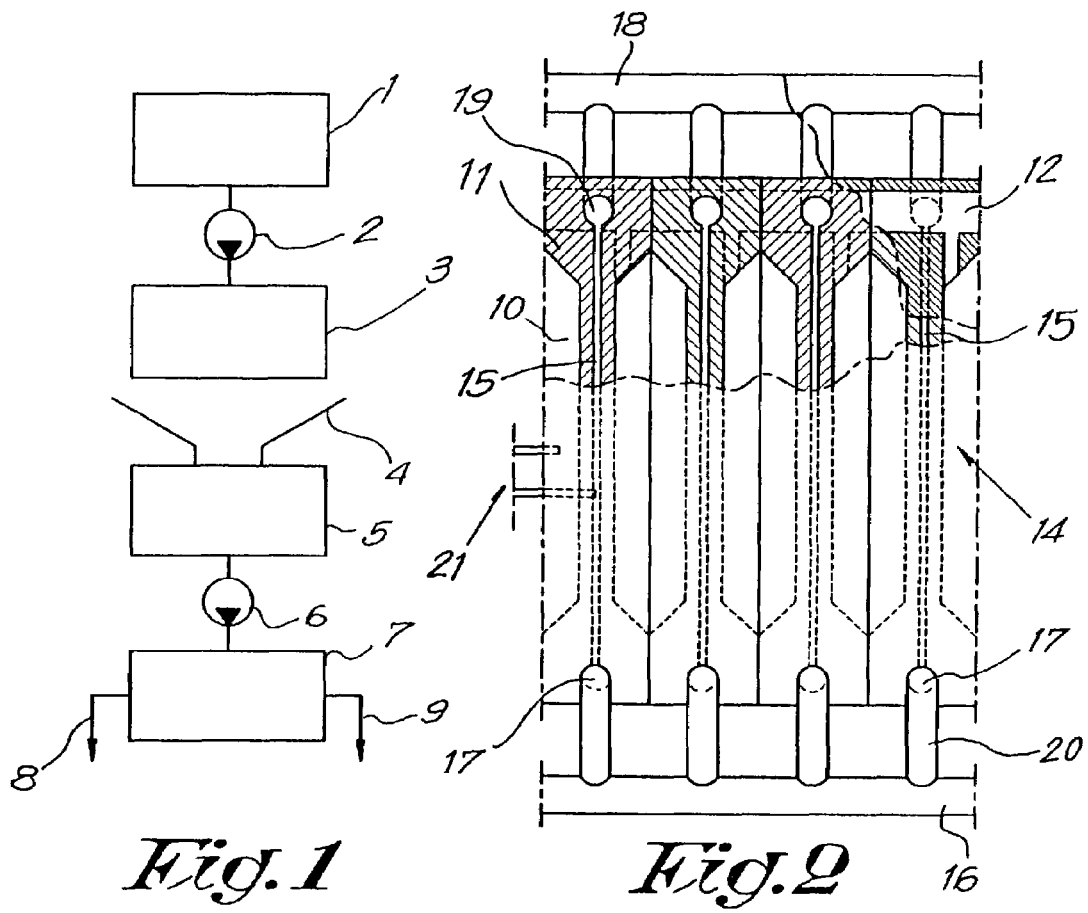
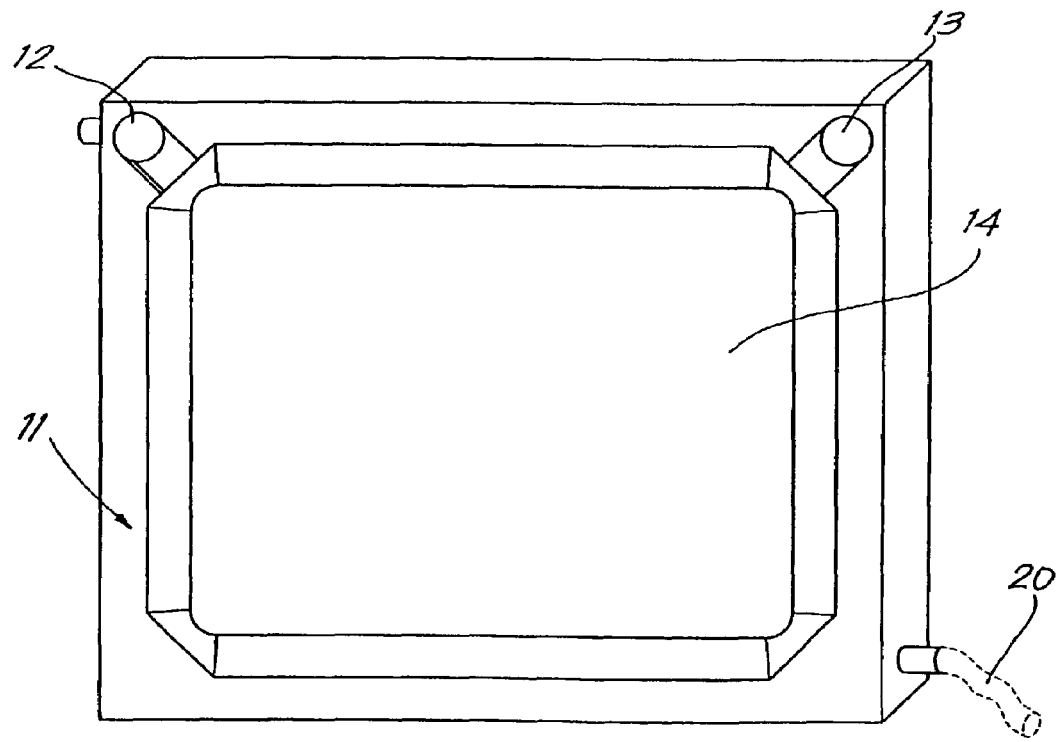
Fig.1  Fig.2
Fig.3

PROCESS AND INSTALLATION FOR THE DRY FRACTIONATION

This application claims the benefit of European Application No. 01202906.2 filed Jul. 31, 2001.

BACKGROUND OF THE INVENTION

The invention relates to a process and an installation for the dry fractionation of edible oils, fats and related products.

Dry fractionation of edible oils and fats is practiced industrially on a large scale and a number of different processes is used for this purpose. Commonly, the oil to be fractionated is fed to a crystallizer where it is cooled so that fat crystals are formed. These crystallizers can be large vessels provided with cooling coils and an agitator to assist heat transfer and prevent the crystals from settling, but other types of crystallizers such as scraped surface heat exchangers and other dynamic crystallizers, are also being used.

The resulting crystal slurry is then subjected to a filtration process to separate these crystals from their mother liquor. The filter cake is referred to as the stearin fraction and the filtrate, the mother liquor, is referred to as the olein fraction. Various filtration systems are used, ranging from a simple band or drum filter to high pressure, fully automated membrane filter presses.

This process works well for oils and fats that form separate, individual crystals on cooling such as palm oil and its fractions, anhydrous milkfat, edible tallow, cottonseed oil, hydrogenated vegetable oils etc.

However, certain oils and fats, notably lard, palm kernel oil and coconut oil tend to form a network of fine crystals rather than separate crystals on cooling, so that a solid mass instead of a pumpable slurry results.

Therefore, other types of fractionation processes are used for such materials. Solvent fractionation is one of these processes, but this is an expensive process. Because of the inflammable nature of the solvent, the plant has to be explosion proof and this greatly increases the investment required. In addition, the evaporation and rectification of the solvent are energy intensive processes.

Therefore, the most commonly used fractionation process for oils like palm kernel oil comprises the solidification of the oil in trays or pans to form blocks, wrapping these blocks individually in a filter cloth and loading the blocks into a hydraulic press to squeeze the olein from between the crystals. The investment required for this process may be fairly low but wrapping the blocks and the subsequent unwrapping of the filter cake make it very labour intensive.

Accordingly, attempts have been made to develop processes that require less labour and that use for instance an automated membrane filter press. U.S. Pat. No. 4,795,569 to Higuchi et al. describes such a process in which the oil is introduced into a filter chamber and allowed to crystallize inside that chamber by circulating a coolant such as water through the space between the membrane and a filter frame.

However, this process requires the filter cloth to be sealed first with a coagula of the material to be treated. This makes it a lengthy process that makes inefficient use of the expensive membrane press.

Accordingly, an improvement has been described in U.S. Pat. No. 5,045,243 to Kuwabara et al. in which the oil or fat to be fractionated is first of all solidified in trays to form solid blocks which are then crushed to yield a pumpable paste that is then introduced into a membrane press to separate this paste into an olein fraction and a stearin fraction. The solidification process is commonly carried out in cooling tunnels. However, these have the disadvantage that the oil is exposed to the air while being cooled and that it is virtually impossible to control the rate of cooling inside the individual trays.

Therefore, an apparatus has been described in European Patent Application 1.028.159 by Yoneda et al. that permits stationary crystallization. In this apparatus, the oil or fat to be fractionated is not solidified into a solid block, but the crystallization process is halted when the partially crystallized mass is still sufficiently fluid to be pumped into the membrane filter press. However, this means that the material to be fractionated has to be diluted with olein before being cooled. This recycling of olein greatly reduces the actual capacity of the apparatus.

SUMMARY OF THE INVENTION

It is therefore an object of the invention to provide a dry fractionation process for edible oils and fats and related products that hardly require manual labour.

It is a further object of the invention to provide a dry fractionation process that fully utilises the filtration capacity of the membrane press.

It is also an object of the invention to protect the material to be fractionated from exposure to air as much as possible.

A further object of the invention is to attain a reproducible crystallization by introducing a controlled temperature profile during cooling and the ensuing crystal development.

It is also an object of the invention to produce fats that can be profitably used in the confectionery industry.

A final object of the invention is to avoid the need to recycle the olein fraction.

The objects of the invention have been attained by a process comprising the steps of:
a) solidifying the product in a crystallizer comprising at least one chamber that is provided with at least one wall permitting heat transfer to form at least one solid block of crystallized material;
b) discharging the chamber and collecting the block;
c) crushing the block so that a pumpable paste is obtained;
d) pumping this paste into a filter press;
e) separating this paste into a liquid fraction and a solids fraction by filtrating and collecting both fractions.

The process according to the invention offers specific advantages for laurel oils like palm kernel oil which tend to solidify when cooled in an agitated crystallization vessel but is not limited to such oils. Palm oil, hydrogenated vegetable oils like soybean oil and other oils and fats used for example to produce for instance confectionery fats can also be profitably fractionated by the process according to the invention. Fat related products like fatty acids or fatty acid esters such as methyl or ethyl esters have also been found to be amenable to being fractionated by the process according to the invention.

The degree of purification of the oils and fats to be fractionated by the process according to the invention has been found not to be critical. Accordingly, crude palm kernel oil can be processed as such, but degummed and/or bleached palm kernel oil and fully refined palm kernel oil also constitute suitable raw materials for the process according to the invention. Similarly, crude palm oil, chemically neutralised palm oil and physically refined oils can all be fractionated according to the invention.

Preferably, the product is solidified in a crystallizer comprising a series of chambers that each are provided with at least one wall permitting heat transfer to form a number of solid blocks of crystallized material, the chambers are discharged and the blocks collected and crushed to pumpable paste.

The raw materials to be fractionated by the process according to the invention will normally be stored in tanks in a molten state since this allows them to be transferred by pumping. Accordingly, their temperatures will be above their melting points and these will have to be lowered considerably to attain the required crystal content.

Accordingly, the process according to the invention comprises preferably a cooling step before solidifying, in which cooling step the oil coming from its storage tank is pre-cooled and/or even pre-crystallized.

This pre-cooling and/or pre-crystallization step will shorten the time needed to attain the required degree of crystallization in the cooling chambers used subsequently in the solidifying step. Seeding the oil with the appropriate fatty crystals can also shorten this time.

In general, the pre-crystallized melt should not contain more than 5% or preferably 2% by weight of fat crystals in the case of lauric oils such as palm kernel oil. For oils such as palm oil, a higher extent of crystallization in the pre-crystallizer, for example 10%, has been found to be fully acceptable.

The invention also relates to an installation for performing the above mentioned process according to the invention, said installation being characterised in that it comprises a crystallizer comprising at least one cooling chamber provided with at least one wall permitting heat transfer, a crusher and a press, and means for transporting blocks formed in the crystallizer to the crusher and the crushed paste to the press.

In order to better define the characteristics of the invention, a preferred embodiment of a process and installation for the dry fractionation is described in the following, as an example without any limiting character, with reference to the accompanying drawings, wherein:

BRIEF DESCRIPTION OF THE DRAWINGS

FIG. 1 shows a block diagram of an installation for performing the process according to the invention;

FIG. 2 schematically shows, partially cut away, a portion of the crystallizer from the installation of FIG. 1;

FIG. 3 shows one of the plates of the crystallizer of FIG. 2.

DETAILED DESCRIPTION OF THE PREFERRED EMBODIMENTS

Referring to FIG. 1, the process for the dry fractionation of edible oils, fats and related products, comprises successively a pre-cooling and possibly pre-crystallization in a pre-cooler 1, pumping by means of pump 2 of the obtained slurry to a crystallizer 3 where a solidifying of the slurry to solid blocks takes place, discharging and collecting these blocks into a hopper 4, crushing these blocks in a crusher 5 so that a pumpable paste is obtained; pumping this paste by means of a pump 6 into a filter press 7 and separating this paste into a liquid fraction 8 and a solids fraction 9 by filtrating and collecting both fractions 8 and 9.

Since the pre-cooler or pre-crystallisor can be a simple equipment like tubular or plate heat exchangers or agitated batch crystallizers provided with cooling coils, their use may constitute a saving in comparison with the direct introduction of the non-cooled raw material to be fractionated into the crystallizer and cooling it in the cooling chambers of the crystallizer.

Nevertheless, this pre-cooling and possibly pre-crystallising is optional.

Cooling in tubular heat exchangers should employ a high product flow rate and a small temperature difference between the product and the cooling medium to avoid crystal deposition on the cooling surface. This is especially important when the material to be fractionated is also to be pre-crystallized.

The crystallizer 3 used is of a type comprising a number of cooling chambers 10.

As shown in FIG. 2, each cooling chamber 10 consists of the space enclosed by two plates 11. The crystallizer 3 comprises a series of such cooling plates 11, assembled like in a filter press, allowing the plates 11 enclosing the cooling chambers 10, to be hydraulically compressed or withdrawn. During operation, the chambers 10 are compressed and therefore closed, and to discharge the solidified blocks of crystallized fat, the press forming the crystallizer 3 is opened so that the blocks can drop down by gravity. This opening and closing can be fully automated.

In general, the plates 11 of the crystallizer 3 will be positioned vertically above the hopper 4 into which the solidified blocks will drop during the discharge of the crystallizer 3.

However, a vertical crystallizer 3 with horizontal cooling plates 11 also falls within the scope of the invention. The solidified blocks can be removed from such a vertical crystallizer 3 by a device that is known per se, comprising a pusher that moves along the crystallizer and empties each cooling chamber in succession. Several of such vertical crystallizers can then be located around a central hopper 4.

To allow the chambers 10 to be filled with the material to be fractionated, a preferred embodiment of the invention entails that each plate 11 is provided with a hole 12 in one of the chamber corners as illustrated in FIG. 3, but holes in the plate recess or on top of the plate also fall within the scope of the invention. Oil that may have been pre-cooled and/or pre-crystallized is fed through this hole 12. Since the presence of the holes 12 makes the chambers 10 communicating vessels, all chambers 10 will be filled to the same height. Care should be taken to avoid stagnant zones in the oil conduits since these may lead to blockage on cooling. The air in the chambers 10 is allowed to escape to atmosphere through a hole 13 in a top corner or on top of the plate 11. This vent hole 13 may be connected to a chimney within the plate that leads to a common exhaust system. Such a system allows the chambers 10 to be evacuated prior to their being filled with the material to be cooled and solidified, thereby minimising its exposure to air. This evacuation can also be used to ensure that the plates 11 surrounding the cooling chambers 10 are in close contact and that no oil will leak away from the system on filling.

Within the recessed part 14 of the plates 11, channels 15 to guide a cooling or heating medium are to be provided. This medium is preferably supplied from a header 16 to a distribution channel 17 situated in the lower part of the plates 11 and connected to the channels 15, and collected in a collector 18 through a collecting channel 19 situated in the upper part of the plates 11 and also connected to the channels 15. To allow the crystallizer 3 to be opened, the channels 17 are to be connected with the header 16 and the channels 19 with the collector 18 by flexible tubing 20. Preferably, the plates 11 are provided with thermocouples 21 that permit the temperatures of the oil and the heat exchange medium to be monitored and/or controlled.

The plates 11 surrounding the cooling chambers 10 are preferably made from a thermoplastic material like for instance polypropylene. This material provides a good seal between the plates, provided a certain hydraulic pressure is maintained by the crystallizer 3. This is especially important during the cooling period when the plates 11 will shrink as their temperature drops.

However, thermoplastic materials have a lower thermal conductivity than metals so that metal plates may have some advantages over thermoplastic plates. Both fall within the scope of the invention. A plate 11 made with a thermoplastic surround that encloses a metal insert to channel the cooling medium also falls within the scope of the invention.

The width of the chambers 10 has been found to be hardly critical for the process according to the invention, in that chambers 10 of 1-10 cm width have been found to be able to produce solidified blocks that could be satisfactorily further processed according to the present invention. Widths near the lower end of the above range allow a faster crystallization but entail a higher investment for a given loading than widths at the upper end of the range. Taking the necessary investment and the cycle times into account, the optimum chamber width looks like being 3-6 cm but other widths also fall within the scope of the invention.

In the process according to the invention, the cooling chambers 10 are filled with the oil or fat to be fractionated and the fat is then cooled and solidified within these chambers 10 by heat transfer through the chamber walls. This filling will take place after the previous batch has been discharged and the crystallizer 3 has been closed again. At this stage, the plates 11 enclosing the chambers 10 will have a temperature that is close to the final crystallization temperature. However, in an embodiment of the invention, the plates 11 may be heated to a pre-set temperature in order to melt all residual crystals from the previous cycle.

After the chambers 10 have been filled, their contents are cooled by means of the channels 15 in the plate recesses. Cooling is preferably gradual since using a high temperature difference between oil and cooling medium will lead to a rapid formation of fat crystals against the heat exchange surface, which crystals have a lower thermal conductivity than oil and thus lower the rate of heat transfer. On the other hand, a temporary low cooling medium temperature may induce the formation of crystal nuclei and thus promote the crystallization of the fatty mass within each chamber 10.

The period of time required to achieve a degree of crystallization within the chambers 10 that allows further processing according to the invention will generally take several hours, for instance 4-6 hours. However, it depends on a large extent upon the optional pre-cooling or pre-crystallization, the type of raw material and the degree of crystallization aimed for.

This degree of crystallization can be estimated by calculating a heat balance, for instance by measuring the power consumption of the compressor used to cool the cooling medium and by taking the thermal capacity of the crystallizer 3 into account. The latter can be worked out during a trial run during which the chambers 10 are for instance filled with water. In addition, the calculation can be made more precise by measuring the solid fat content (SFC) of a batch that has been processed according to the invention and adjusting the calculation parameters in line with the measured SFC-value.

Accordingly, measurements of temperature and power consumption of the compressor allow the degree of crystallization within the crystallizer chambers 10 to be monitored during the crystallization process. Therefore, it is possible to use the degree of crystallization as an input parameter for the crystallization control by adjusting the cooling medium temperature. In this way, highly reproducible crystallization is achieved. Optimal cooling profiles have to be worked out in practice. Such cooling profiles can also be used to steer the stearin properties. In the case of palm kernel oil for instance, it has been found possible to produce a stearin with an iodine value below 5 by prescribing a somewhat higher cooling medium temperature.

The crystallizer 3 is preferably located in a room that is kept at a temperature that is close to the final crystallization temperature. This temperature control is not that important during the actual crystallization process but it is much more important during the discharge step. Since a plant operating the process according to the invention may comprise several crystallizers, it is advisable to locate these into the same room; this allows temperature control to be limited to just this room.

In the discharge step of the process according to the invention, the chambers 10 are emptied. This is achieved by opening the crystallizer 3 as a result of which the solidified blocks will drop out by gravity. They are collected in the hopper 4 located underneath the crystallizer 3. Complete emptying of the crystallizer 3 is preferably realised by mechanical means that are known per se.

Raising the temperature of the walls of the crystallization chambers 10 at the control panel of the fractionation plant constitutes another means of ensuring complete crystallizer discharge. This rise in temperature has been found to hardly affect the degree of crystallization within the blocks; it only facilitates their being discharged. Shock cooling the blocks may also facilitate their being discharged.

Since heat transfer is a dynamic process requiring a temperature difference, the blocks on discharge may well be cooler on the outside than in the centre. In addition, the degree of crystallization on the outside may be higher than in the centre. It can therefore be advantageous to provide the blocks with a resting period during which they can equilibrate before crushing them. Therefore, the room housing the crystallizer 3 is preferably temperature controlled. During this resting period, the blocks will be exposed to air but since the blocks are solid and cold, this exposure will hardly lead to product deterioration. The length of this resting period has been found not to be critical but the period of time between the crushing of the blocks and the resulting paste being fed to the membrane filter press 7 should preferably not exceed 1 hour and even more preferably be less than 30 minutes to prevent the paste from stiffening.

The blocks are crushed in the crusher 5 by methods that are known per se. Such a method may for instance involve screw feeding the blocks from the hopper 4 to the mono-pump 7 used to feed the membrane filter press 7. Positioning this mono-pump 7 immediately downstream of the crushing stage also has the advantage that the fatty paste formed by the crushing step has no time to stiffen again so that its pumpability and fluidity are maintained.

In the final step of the process according to the invention, the fatty paste inside the membrane filter press 7 is compressed so that the liquid fraction 8, this is liquid olein passes through the filter cloth to be collected as such and the solids fraction 9, this is stearin cake is discharged by opening the press. Standard equipment as used in the dry fractionation of edible oils and fats and that is preferably fully automated can be used for this purpose. The pressure to be applied during the membrane filtration process has been found to fall within the range offered by commonly used membrane presses. A pressure of for example 2-3 MPa is fully adequate for the process according to the invention.

The following examples further illustrate the present invention in detail but are not to be construed to limit the scope thereof.

EXAMPLE 1

In this Example, crude palm kernel oil of Malaysian origin was used as the raw material. Its free fatty acid content was 3.0% expressed as oleic acid and its iodine value (Wijs) was 18.3 (g iodine per 100 g of oil). This oil was cooled and partially crystallized to a Solid Fat Content (SFC) of about 1% from a temperature of 60° C. to 24.5° C. over a period of almost 3 hours while being gently agitated in a dynamic crystallizer (initially at 40 rpm; finally at 30 rpm).

This partially crystallized melt was then pumped into a crystallizer according to the invention having cooling chambers of 50 mm width. The cooling water temperature was maintained at 18° C. throughout the crystallization period of 5 hours. After this period, the palm kernel oil had solidified into solid blocks that were taken out of the cooling chambers and then crushed. A sample of the crushed material showed an SFC of 28% and a temperature of 20° C. When subjected to filtration under a pressure of 2.5 MPa, palm kernel olein was liberated in a yield of 62.5%. The palm kernel stearin obtained in a yield of 37.5% had an iodine value of 6.6. This example shows that the crystal paste obtained by the process according to the invention allows of a good separation during the pressure filtration step in that the resulting filter cake had a calculated SFC of almost 75%.

In a similar experiment, the same crude palm kernel oil was crystallized under the same conditions but after the 5 hour crystallization period, the cooling water temperature was raised to 30° C. for a period of 15 min after which period the cooling chambers were opened. The solidified blocks were then crushed and a sample of the crushed material showed an SFC of 26% and a temperature of 22° C. When this material was then filtered under pressure (2.5 MPa), a 32% yield of palm kernel stearin with an iodine value of 5.5 resulted. This experiment clearly shows that stearin properties can be effectively controlled by adopting an appropriate temperature profile during the crystallization step of the process according to the invention.

EXAMPLE 2

In this example, fully refined (i.e. degummed, bleached and physically refined) palm kernel oil with a free fatty acid content of 0.1% was used as raw material. It was pre-cooled to a temperature of 22° C. over a period of 130 min, which led to a pre-crystallization of about 1%. The pre-crystallized palm kernel oil was then fed into cooling chambers of 40 mm width where it was cooled by circulating water of 18° C. through the walls of the chambers. After 3.5 hours, the chambers were opened and the solidified blocks were crushed. The SFC of the crystal paste was 27% and its temperature was 23° C.

Subjecting this paste to a pressure filtration at 2.5 MPa led to a 40% yield of palm kernel stearin with an iodine value of 6.9. This example therefore shows that a decrease in cooling chamber width allows a faster crystallization and also that palm kernel stearin of fully acceptable quality can be produced in a very high yield by using the process according to the invention.

EXAMPLE 3

In this example, a cooling chamber width of 30 mm was used and the period of crystallization was varied. Palm kernel oil of Malaysian origin having a free fatty acid content of 2.2% and an iodine value of 17.8 was pre-crystallized over a period of 135 min and then fed to these cooling chambers. Samples of the solidified material were taken at the end of each crystallization period for SFC determination and then the material was crushed and subjected to filtration under pressure (2.5 MPa)

TABLE 1

Process conditions and properties during palm kernel oil fractionation

| | | | |
|---|---|---|---|
| Period of crystallization (hours) | 2.0 | 3.5 | 5.0 |
| SFC of solidified material (%) | 26 | 30 | 34 |
| Stearin yield after filtration (%) | 39 | 43 | 45 |
| Calculated SFC of stearin (%) | 67 | 70 | 76 |
| Iodine value of stearin | 6.9 | 6.7 | 7.0 |

As shown by Table 1, increasing the period of crystallization leads to a higher degree of crystallization in the cooling chambers of the crystallizer. It also leads to a higher calculated SFC of the stearin as a result of which the iodine value of the stearin remains within specification.

EXAMPLE 4

In this example, the crystallization temperature was varied as well as the length of solidification time. The same crude palm kernel oil as used in Example 3 was pre-crystallized and then solidified in the cooling chambers of 30 mm width that were also used in Example 3. The experimental details and results have been summarized in Table 2.

TABLE 2

Process conditions and stearin data for palm kernel oil

| | | | |
|---|---|---|---|
| Period of crystallization (hours) | 2.0 | 3.5 | 5.0 |
| Cooling water temperature (° C.) | 18 | 20 | 22 |
| SFC of solidified material (%) | 24 | 23 | 23 |
| Stearin yield after filtration (%) | 38 | 35 | 31 |
| Calculated SFC of stearin (%) | 63 | 66 | 74 |
| Iodine value of stearin | 6.9 | 5.2 | 4.4 |

Table 2 shows that the process according to the invention allows palm kernel stearin with a very low iodine value to be produced by slightly raising the cooling water temperature during the solidification step. As is only to be expected, a low iodine value implies a somewhat reduced stearin yield. However, the ability to produce stearins with such low iodine values permits the production of stearins with a somewhat higher and standard iodine value by blending the low iodine value stearin with palm kernel oil. This greatly facilitates final product quality control.

EXAMPLE 5

In this example, a fully refined palm oil mid fraction was processed according to the invention. This mid fraction had a free fatty acid content of 0.04%, an iodine value of 45 and contained 45% symmetrical dipalmito-oleate triglycerides (POP). The mid fraction was slowly pre-crystallized over a period of 4 hours from a temperature of 70° C. down to 20° C., while the rate of agitation was gradually reduced from 40 rpm to 25 rpm. This led to an SFC of the pre-crystallized melt of about 9%.

This pre-crystallized melt was then further solidified in cooling chambers according to the invention having a width of 40 mm for a period of 4 hours while maintaining a cooling water temperature of 18° C. After this period of 4 hours, the solidified blocks were crushed and a sample of the crushed material showed an SFC of 30% and a temperature of 21° C. The crushed material was filtered at a pressure of 2.5 MPa. A stearin with an iodine value of 33.9 and a POP content of 62% was obtained as the filter cake in a yield of 41%. The resulting olein had an iodine value of 53.2 and a POP content of 35%.

In a similar experiment the same palm mid fraction was pre-crystallized as described above and allowed to solidify in the same cooling chambers but instead of a cooling water temperature of 18° C., a temperature of 16° C. was chosen. The period of solidification remained the same at 4 hours. This lowering of the cooling water temperature during the solidification step led to an increase of the SFC after crushing from 30% to 34%, an increase in filter cake yield from 41% to 42%, an increase in the iodine value of the filter cake from 33.9 to 36.3 and a decrease in its POP content from 62% to 59%. It also led to an increase of the SFC of the filter cake from 73%, which is already a high value, to an even higher value of 81%.

These experiments show that the process according to the invention can be profitably used for the production of cocoa butter equivalents by allowing the production of vegetable oil fractions with a high POP content. In comparison with other existing dry fractionation processes for such confectionery fats, the process according to the invention is very fast indeed. It only requires 4 hours pre-crystallization and another 4 hours solidification.

EXAMPLE 6

Anhydrous milk fat with a dropping point of 30.5° C. was pre-crystallized by first heating the oil to 55° C. and then cooling it to 24.7° C. over a period of 240 min using a well defined cooling curve under controlled agitation. When the SFC of the melt had reached 7%, the partially crystallized melt was introduced into cooling chambers of 50 mm width being supplied with cooling water of 15° C. After 240 min, solid blocks with a temperature of about 18° C. had been formed that were taken out of the chambers. Samples were taken from the blocks and these showed an SFC of 15-17%. The blocks were crushed and the SFC of the crushed paste was 16% and its temperature had risen to 20.5° C. Filtration under pressure (0.6 MPa) led to a 55% yield of olein having a dropping point of 15.2° C., the dropping point of the stearin was 36° C.

EXAMPLE 7

Tallow fatty acids with an iodine value of 54.7 were pre-crystallized by heating them to 70° C. and then cooling them to 39.6° C. over a period of 180 min using a well defined cooling curve under controlled agitation. When the SFC of the melt had reached 3.5%, the partially crystallized melt was introduced into cooling chambers of 50 mm width employing a cooling water of 5° C. After 270 min, solid blocks with a temperature of about 12° C. had been formed that were taken out of the chambers. Samples were taken from the edges of the blocks and these showed an SFC of 38-40% whereas samples from the middle of the blocks showed SFC values of 36-37%. The blocks were crushed and the SFC of the crushed paste was 37% and its temperature had risen to 19.0° C. Filtration under pressure (2.5 MPa) led to a 46% yield of olein having an IV of 87.8. The IV of the stearin was 22.8.

In a similar experiment using the same tallow fatty acids, the crushed cakes had an SFC of 37% and a temperature of 18.8° C. When this was subjected to pressure filtration, a yield of 51% of olein with an IV of 92.2 was obtained. The IV of the stearin was 18.

This example clearly shows that the process according to the invention is not limited to triglyceride oils, but can also be profitably used for fat related products such as for instance fatty acids.

Therefore, the invention, is well adapted to carry out the objects and attain the ends and advantages mentioned, as well as others inherent therein. While the invention has been depicted, described and defined by reference to exemplary embodiments of the invention, such references do not imply a limitation on the invention, and no such limitation is to be inferred. The invention is capable of considerable modification, alteration, and equivalence in form and function, as will occur to those ordinarily skilled in the pertinent arts and having the benefit of this disclosure. The depicted and described embodiments of the invention are exemplary only, and are not exhaustive of the scope of the invention. It is intended that all such variations within the scope of the invention, giving full cognisance to equivalence in all respects, be included within the scope of the appended claims.

The invention claimed is:

1. An installation for the dry fractionation of edible oils, fats and related products, comprising:
   a crystallizer,
   a crusher,
   means for transporting solid blocks of crystallized material formed in the crystallizer to the crusher,
   a filter press, and
   means for transporting a paste obtained in said crusher to said filter press,
   wherein said crystallizer comprises at least one cooling chamber provided with at least one wall permitting heat transfer to form at least one solid block of crystallized material.

2. The installation of claim 1, wherein a width of said cooling chamber of the crystallizer is from 1 to 10 cm.

3. The installation of claim 1, wherein a width of said cooling chamber of the crystallizer is from 3 to 6 cm.

4. The installation of claim 1, wherein said cooling chamber is mounted in a hydraulic press and connected to a heat exchange medium supply system.

5. The installation of claim 1, wherein said cooling chamber of said crystallizer comprises thermocouples to measure temperature of a product to be fractionated and/or of a heat exchange medium.

* * * * *